United States Patent [19]

Schütz

[11] Patent Number: 4,997,561

[45] Date of Patent: Mar. 5, 1991

[54] FILTERING APPARATUS COMPRISING PARALLEL CYLINDRICAL FILTER ELEMENTS DISPOSED IN A HOUSING CHAMBER

[75] Inventor: Rudolf Schütz, Königstein-Falkenstein, Fed. Rep. of Germany

[73] Assignee: Faudi Feinbau GmbH, Oberursel, Fed. Rep. of Germany

[21] Appl. No.: 416,422

[22] Filed: Oct. 3, 1989

[30] Foreign Application Priority Data

Oct. 13, 1988 [DE] Fed. Rep. of Germany ....... 3834813

[51] Int. Cl.$^5$ ............................................... B01D 27/00
[52] U.S. Cl. ................................. 210/232; 210/323.2; 210/346
[58] Field of Search ..................... 210/232, 238, 323.1, 210/323.2, 324, 326, 328, 329, 339, 340, 346, 402, 435

[56] References Cited

U.S. PATENT DOCUMENTS

| Re. 31,966 | 8/1985 | Sillers | 210/238 |
| 4,134,836 | 1/1979 | Rowley et al. | 210/232 |
| 4,340,476 | 7/1982 | Potz et al. | 210/232 |
| 4,436,621 | 3/1984 | Picker | 210/232 |
| 4,522,717 | 6/1985 | Brust | 210/238 |
| 4,535,997 | 8/1985 | Brust | 277/102 |
| 4,673,499 | 6/1987 | Koch et al. | 210/295 |

FOREIGN PATENT DOCUMENTS

| 1143279 | 2/1963 | Fed. Rep. of Germany | 210/232 |
| 220776 | of 1892 | France | 210/323.2 |
| 343148 | of 1904 | France | 210/323.2 |
| 832050 | 4/1960 | United Kingdom | 210/329 |

Primary Examiner—Peter Hruskoci
Assistant Examiner—Robert J. Popovics
Attorney, Agent, or Firm—Burns, Doane, Swecker & Mathis

[57] ABSTRACT

In a filtering apparatus several elongated filter elements are located parallel to each other in a housing chamber. Free ends of the filter elements are connected by means of a narrow support member fastened to the housing. Arms are pivotingly adjustably connected to the support member. The arms include slots for receiving a threaded spindle projecting from the filter elements. The arms can be swung out of the way to permit insertion of the filter elements and then rotated until the slot becomes aligned with the spindle. Thus, the filter elements can be installed separately and sequentially.

15 Claims, 2 Drawing Sheets

FILTERING APPARATUS COMPRISING PARALLEL CYLINDRICAL FILTER ELEMENTS DISPOSED IN A HOUSING CHAMBER

BACKGROUND OF THE INVENTION

The invention concerns a filtering apparatus which includes a housing in which several parallel filter elements are placed. One end of each filter element is fastened to a housing partition wall, and the other end is attached by means of an axially projecting threaded spindle element to a support member mounted in the housing.

Such a filtering apparatus serves, for example, to filter solids and/or water from liquids such as fuels and other liquid carbohydrates. A field of application which poses particularly high requirements for these filters is the purification of aircraft fuels. For this purpose stationary or mobile filters are used, which must provide a very high degree of separating and trapping actions.

In the usual configuration of these filters several separator and trapping elements are located in a generally cylindrical housing, which hereafter will be referred to as filter elements. These filter elements are fastened at one end, i.e., an end that is provided with an inlet opening, to a partition wall of the housing. The partition separates a clean chamber from a sediment chamber of the housing.

The usually long and slender filter elements must also be supported at their other ends. For this purpose, a threaded member is used which, for example, is in the form of a center spindle projecting from the end of the filter element. The spindle may extend entirely through the filter element to fasten the filter element to the housing partition and to clamp together the end flanges of the filter element.

At the end facing away from the partition wall this spindle protrudes and is fastened to a structural part such as an end wall, spider or grid, which, in turn, is secured to the inside of the cylindrical wall of the housing.

In the course of the installation of the filtering apparatus and the replacement of filter elements, the spider is installed and fastened last, following the mounting of the filter elements. Often, the mounting means on the partition wall which receives one end of the filter element is not properly aligned with the opposing bore in the spider that is to receive the projecting end of the spindle. Thus, it may be necessary to bend the filter element so that it properly mates with the spider. The deformations incurred in this manner could result in damage to the filter elements or to a seal which seals the filter element relative to the partition wall.

To remedy this problem, a known filtering apparatus of the above-mentioned type, e.g., see U.S. Pat. No. 4,340,476 (corresponding to German Patent No. 30 24 106), has the filter element mounted on the partition wall in a non-rigid manner, without affecting the sealing action in this location. It is made possible in this manner to displace the opposite free ends of the filter elements during installation, until they fit into the receiving bores of the spider. To facilitate the process, the receiving bores may be shaped conically. However, the overall installation is made more difficult in that the threaded spindles of all of the filter elements must be aligned and introduced simultaneously into the receiving bores of the spider.

This problem also exists in another known form which it is possible to individually set the receiving bores on an end wall to adapt to filter elements rigidly connected with the partition wall. The end wall is in the form of a plate containing circular disks associated with respective filter elements. Each disk is held rotatably in the plate and contains the receiving bore into which the threaded spindle of the respective filter element is to be inserted. The receiving bore is in the form of a linear elongated slot formed in the circular disk in a diametrical direction. By rotating the disk and shifting the threaded spindle within the elongated slot, the fastening location for a given filter element may be aligned with the end of the threaded spindle.

This arrangement is relatively complicated. In addition, it disadvantageously requires that all of the spindle elements be introduced simultaneously into the elongated slots of the spider.

It is, therefore, an object of the invention to provide a filtering apparatus of the afore-described type which makes it possible by means of a simple structural configuration of the spider to mount each filter element successively and separately, whereby alignment relative to the position of the free end of the individual filter elements could be achieved in a simple manner.

SUMMARY OF THE INVENTION

This object is attained according to the invention in that the spider or support member includes a bridge part connected releasably with the housing, with support arms mounted in a pivotingly adjustable manner to the bridge part so that a filter element is able to be connected to a free end of each supporting bracket. There is provided a further adjustment on the arm, e.g., in the form of a slot at the free end of the arm, which enables the filter element to be connected at a connecting point which can assume various locations along a longitudinal axis of the arm.

The ability to pivot each arm and the further adjustment possible along the arm axis enables the individual filter elements to be separately and successively, installed or removed, whereby the replacement of filter elements is significantly simplified, especially if only certain individual filter elements need to be replaced.

The bridge part may be in the form of a relatively narrow structural part, so that the fluid flow in the area of the element spider is not disturbed. The narrow arms also do not interfere with the liquid flow. This is important, because on the side of the housing chamber facing away from the filter elements a zone of quiet flow is present, in which the liquid is to flow as freely as possible.

The bridge part, therefore, preferably is in the form of a narrow web, from which a rigid leg is branching off, the free end of the leg containing a hole of which is spaced from the center area of the bridge part. In spite of the small width of the bridge part, all of the arms for the filter elements may be readily attached.

Preferably, the arms extend approximately vertically, so that when the housing is horizontal, stress on the arms is directed in the longitudinal direction of the arms, so that their pivot mounting is subjected to a smaller moment.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which.

DETAILED DESCRIPTION OF A PREFERRED EMBODIMENT OF THE INVENTION

Figure 2:
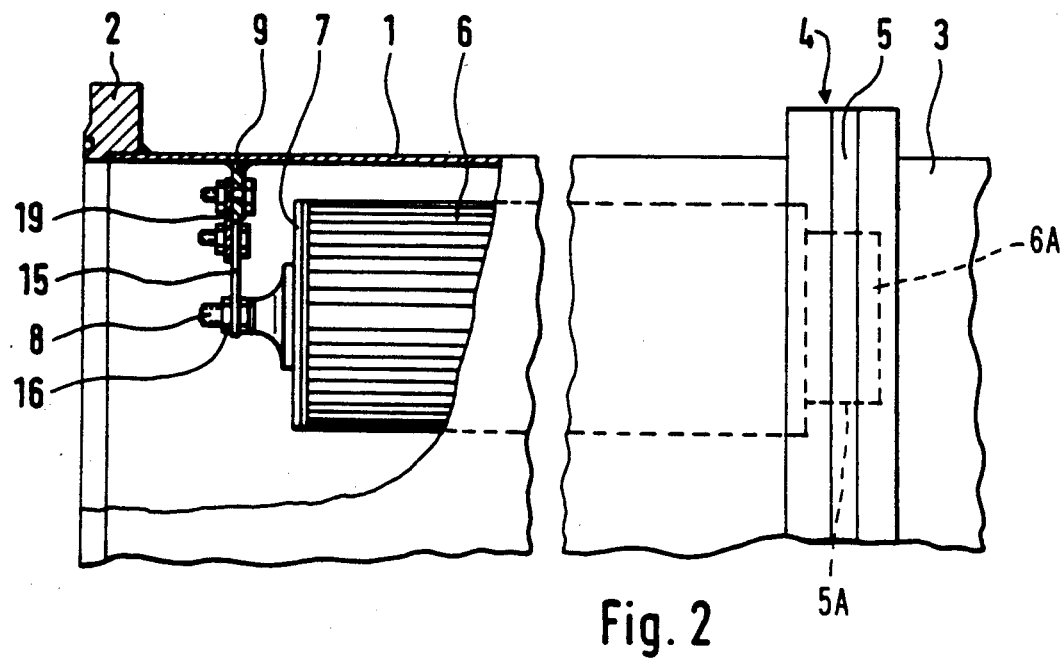
FIG. 2 is a cross-sectional view taken along the line II—II in FIG. 1.

The filtering apparatus shown in the figures comprises a housing which includes a cylindrical housing section 1 (depicted in either the vertical or horizontal position), which is closed at one end by means of an end plate (not shown) attached to a flange 2 of the housing. That end plate may contain a fluid outlet passage. The other end of the housing is formed by a housing dome 3, shown only partially in FIG. 2. A flange coupling 4 connects the housing dome 3 to the cylindrical housing section 1. A partition wall 5 is sealingly inserted between the flanges. The partition wall 5 contains a plurality of passages 5A, only one of which being shown, into which are inserted the projecting ends 6A of the filter elements 6. The filter elements are arranged closely in parallel within a chamber defined by the cylindrical housing section 1.

Some of the filter elements 6 may be adapted to separate solids from the liquid being filtered, while other filter elements 6 may be adapted for liquid/liquid separation, e.g., to separate water from the liquid. At least at its free end remote from the partition wall 5 each of the filter elements has an end plate 7, from a threaded spindle 8 is projecting. The spindle may extend over the entire length of the filter element 6, or it could comprise a threaded stem fastened to the free end of the filter element 6. In the former case, the spindle 8 could be connected to the partition in any suitable manner.

In the vicinity of the free ends of the filter elements 6, three projecting holding brackets 9 are welded to the inner wall of the cylindrical housing section 1. Between two of the holding brackets 9 a first support member in the form of a bridge part 10 is mounted by means of screws 11. The bridge part 10 extends transversely across the housing chamber. The bridge part 10 is essentially in the form of a narrow web 12A extending between the brackets 9, with a rigid leg 12 extending from that web. Thus, the portions 12A, 12 constitute branches of the support member 10. Disposed in a free end of the leg 12 is a fastening hole 13, the hole 13 being spaced from a center area of the web 12A. Additional fastening holes 13 are located along the web 12A. The holes 13 serve to receive screws 14, which pass through first fastening holes in support brackets or arms 15, whereby the arms 15 are attached in a pivotingly adjustable manner to the web. Each of these arms 15 is in the form of a narrow, elongated arm connected at its other end to a filter element 6 by means of a threaded nut 16 which mates with the threaded spindle of the filter element 6. That spindle passes through a second fastening hole of the arm 15. Of the two fastening holes of each arm 15, at least one comprises an elongated hole 17 so that displacement of each arm in the longitudinal direction of the arm 15 is possible. In this manner both the angular position and spacing of each connecting point for the associated spindle 8 may be varied relative to the bridge part 10.

On a third, upper holding bracket 9 in the housing section 1 there is mounted a second support member 19 which is of triangular plate shape. That plate 19, which is mounted by a screw 18, constitutes a bridge part and is connected to two arms 15 in the same manner as discussed earlier. Those arms contain elongated slots 17 which are connected to spindles 8 of filter elements 6.

Preferably, the filter elements which perform one type of separation, i.e., either solids separation or water separation, are mounted on the first support plate 10, while the filter elements which perform the other type of separation are connected to the other support member 19.

The second support member 19 could alternatively be shaped as a narrow web similar to the first support member 10. This form is preferred, if more than two filter elements 6 are fastened to the second support member.

The support members 10 and 19 form, together with the arms 15, a spider for receiving the free ends of the filter elements 6. Since each arm 15 may be released and adjusted separately, it is possible to align and mount each individual filter element 6 separate and in succession.

Figure 1:
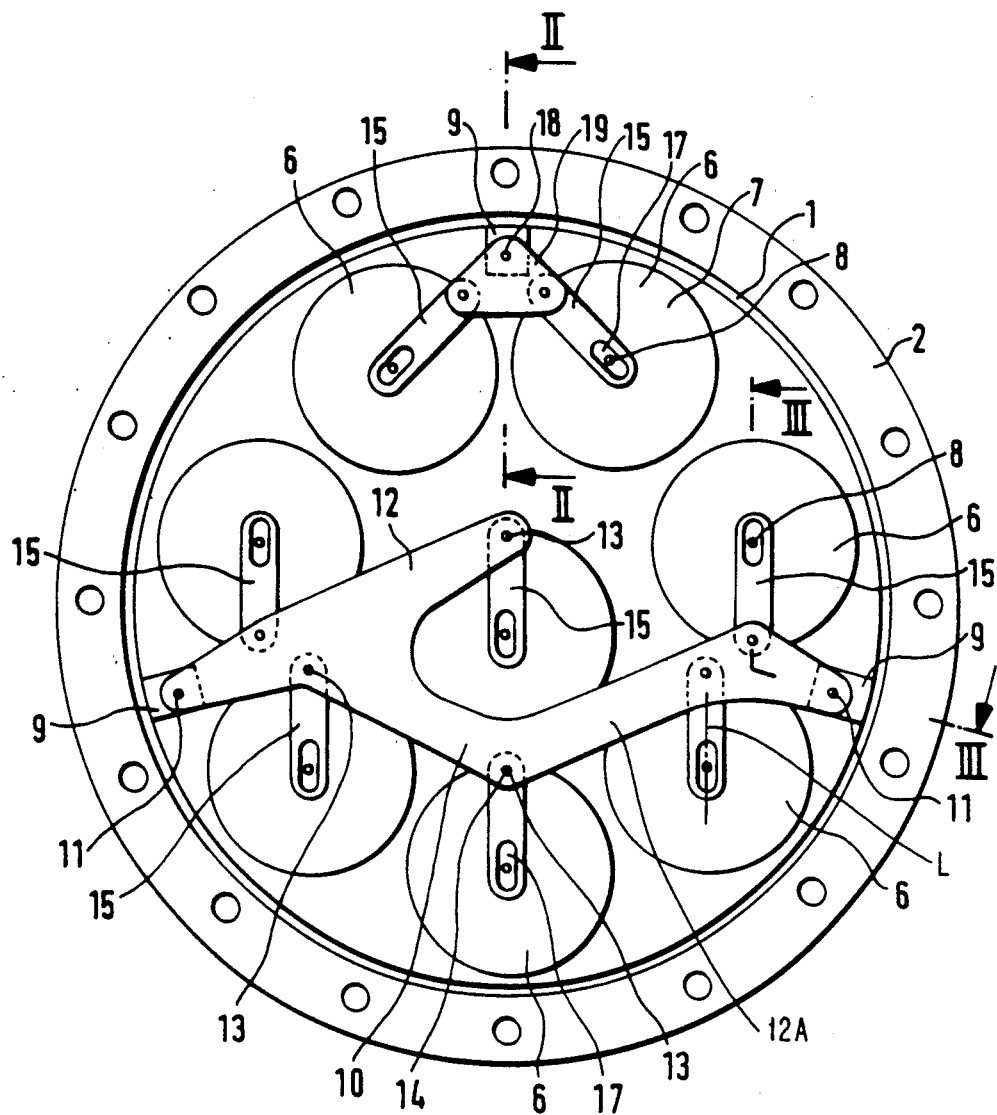
FIG. 1 is a front end view of a filtering apparatus according to the invention with the housing opened.

For the sake of clarity, in FIG. 1 the nuts securing the spindles are not depicted. While the arms 15 mounted on the bridge part 10 extend parallel and vertically (assuming a horizontal orientation of the filter elements 6) the arms 15 mounted on the plate 19 extend at an angle relative to one another and obliquely from the plate 19. In the configuration shown, the elongated hole 17 of each arm 15 is located at the end to which the corresponding filter element 6 is fastened. It is evident that the elongated hole 17 could instead be located at the other end of the arm 15.

As seen in FIG. 1, all of the arms 15 are of similar construction. This simplifies their production and installation. The configuration chosen for the support members 10 and 19 is adapted to the particular arrangement and number of filter elements 6 and is not restricted to the form shown.

In practice, liquid to be filtered is conducted into the inlet end 6A of the filter element and exits radially from the filter element 6 and then is discharged through an outlet in the end plate (not shown).

It will be appreciated that the present invention enables the filter elements 6 to be installed and removed separately and sequentially. The support members 10, 19 are spaced from the inside wall of the housing to define therewith a recess sufficiently large in size to accommodate insertion of the filter elements into the housing chamber. Since the arms 15 are pivotably mounted, they can be swung to an out-of-the-way position during such insertion of the filter elements. The sequence in which the filter elements are inserted is determined to assure that none of the filter elements, after being installed will block insertion of any other filter element. Thus, for example, all of the three lowermost filter elements 6 in FIG. 1 will be installed before all of the three intermediate filter elements have been installed. The uppermost pair of filter elements connected to the support member 19 can be installed at any time since they do not block, and are not blocked by, any of the other filter elements.

Figure 3:
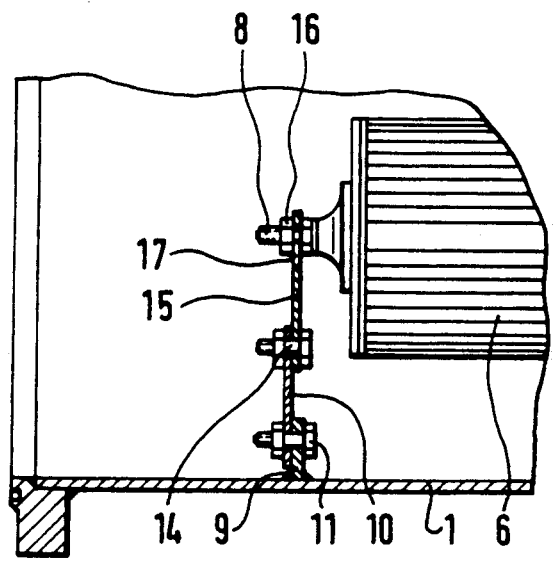
FIG. 3 is a cross-sectional view taken along line III—III in FIG. 1.

After a filter element has been inserted such that its inlet end is mounted in the partition wall 5, the screw 14 of the associated arm 15 is loosened to enable the arm to be swung and manipulated until the spindle 8 is able to be received in the slot 17. The slot 17 defines a means of adjustment which enables the connecting nut 16 to be located at various positions of adjustment along a longitudinal axis L of the arm which axis extends through (i) the pivot axis defined by the pivot pins or screws 14 and (ii) the point of connection of the threaded connectors 8, 16. Accordingly, by means of such a multi-directional adjustability, it is assured that the spindle 8 can be connected to the arm 15 without the need to bend or otherwise deform the filter element. While the screw 14 is in a loosened state, the arm 15 is sufficiently loose to have its free end moved away from the spindle (i.e., moved to the left in FIG. 3) to permit the spindle to become aligned with the slot. Thereafter, the screw 14 and nut 16 can be tightened to secure the arm 15 and filter element 6 in a final position.

It will be appreciated that the above-described advantages of the invention can be achieved by slightly modified arrangements. For example, as alluded to earlier, in lieu of a slot 17, a round hole could be disposed at the filter-connecting end of the arm 15, with the slot 17 disposed instead at the opposite end of the arm to receive the screw 14. Thus, the slot would enable the arm itself, along with the round hole and nut 16, to be adjusted along the axis L so that the round hole and nut could be brought into alignment with the spindle 8. Alternatively, the slot could be disposed in the support member 10 whereby the arm 15 and the location of pivot screw 14 could be adjusted along the axis L, accompanied by an adjustment of the arm, hole, and nut 16 along the axis L (since the arm, hole, and nut would move with the arm).

Moreover, in lieu of positioning the threaded spindle 8 on the filter element 6, the spindle could be formed as an externally threaded screw projecting through a hole in the arm and received in an internally threaded connecting hole disposed in the end of the filter element.

The support member 10 and arms 15 are narrow and do not interfere appreciably with liquid flow therepast.

Although the present invention has been described in connection with a preferred embodiment thereof, it will be appreciated by those skilled in the art that modifications, additions, substitutions, and deletions not specifically described may be made without departing from the spirit and scope of the invention as defined in the appended claims.

What is claimed is:

1. A filtering apparatus comprising:
    housing means defining a chamber therein, with a wall means disposed at one end of said chamber, defining a plurality of liquid passage means,
    a plurality of filter elements disposed within said chamber and extending in parallel relationship from said passage means, each filter element having first and second ends, said first end mounted to said wall means, first connecting means disposed at said second end,
    support means fastened to said housing and projecting transversely across said chamber, a section of said support means being spaced transversely from an inside wall of said housing to form therewith a recess of sufficient size to accommodate insertion of said filter elements into said housing,
    a plurality of arms, each arm having first and second ends, said arm first ends being pivotably adjustably connected to said support means for rotation about pivot axes disposed parallel to said filter elements, each of said arm second ends carrying second connecting means connected to said first connecting means at a point of connection lying on a longitudinal axis extending through said pivot axis and said point of connection, each of said arms including adjustment means for enabling the location of said second connecting means to be adjusted along said longitudinal axis.

2. A filtering apparatus according to claim 1, wherein said one of said first and second connecting means comprises an external thread and the other of said first and second connecting means comprises an internal thread.

3. A filtering apparatus according to claim 2, wherein said external thread defines said first connecting means and said internal thread defines said second connecting means.

4. A filtering apparatus according to claim 2, wherein said first connecting means comprises an externally threaded spindle projecting from a respective filter element, and said second connecting means comprises an internally threaded nut receiving said spindle.

5. A filtering apparatus according to claim 4, wherein said adjusting means comprises an elongated slot formed in said arm second end.

6. A filtering apparatus according to claim 1, wherein said support means comprises a narrow web.

7. A filtering apparatus according to claim 6, wherein said web comprises a plurality of branches, each of said branches carrying at least one of said arms.

8. A filtering apparatus according to claim 7, wherein one of said branches defines a free end terminating inwardly from said inside wall of said housing.

9. A filtering apparatus according to claim 1, wherein said housing extends horizontally, each of said arms arranged such that said longitudinal axes extend generally vertically when said arms are connected to said filter elements.

10. A filtering apparatus according to claim 1, wherein said arms are arranged such that said longitudinal axes extend substantially parallel to one another when said arms are connected to said filter elements.

11. A filtering apparatus according to claim 1, wherein said support means comprises first and second support members each carrying a plurality of said arms.

12. A filtering apparatus according to claim 11, wherein one of said support members comprises a web connected at a plurality of locations to said housing, another of said support members comprises a support plate spaced from said web.

13. A filtering apparatus according to claim 12, wherein filter elements connected to one of said support members are adapted for solid/liquid separation, and filter elements connected to the other of said support members are adapted for solid/liquid separation.

14. A filtering apparatus according to claim 1, wherein said arms are of identical construction.

15. A filtering apparatus according to claim 1, wherein said support means is removably secured to brackets projecting from said inside wall of said housing.

* * * * *